No. 845,242. PATENTED FEB. 26, 1907.
L. LEIDL.
MAST FOR WIRELESS TELEGRAPHY AND OTHER PURPOSES.
APPLICATION FILED AUG. 1, 1906.
2 SHEETS—SHEET 1.
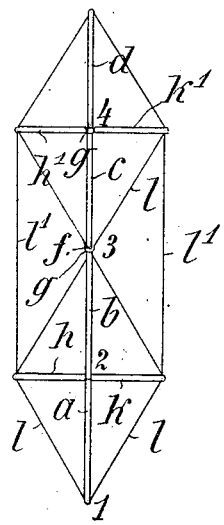
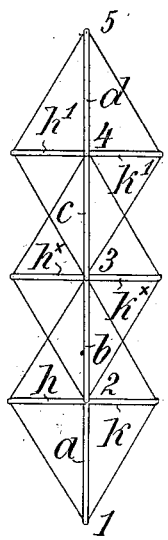
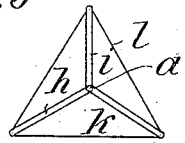
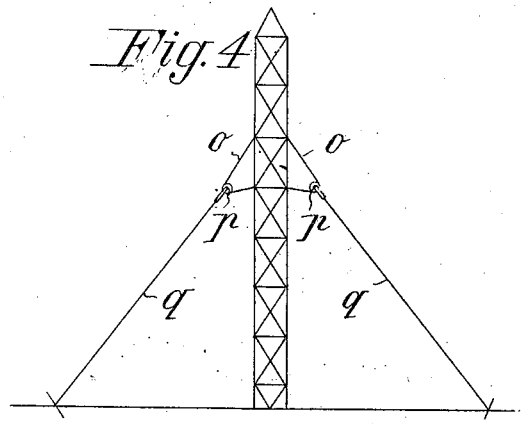
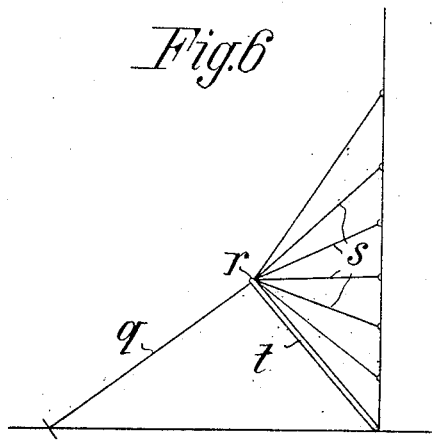
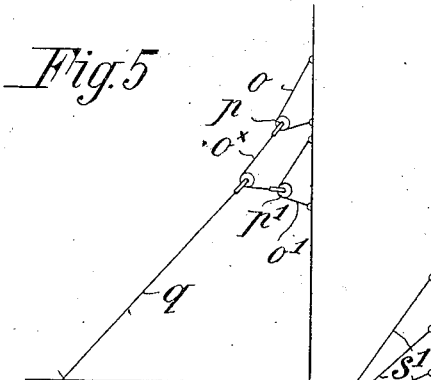
Witnesses
R. W. Helff.
P. Sommers
Inventor
Ludwig Leidl
by Henry Orth Jr.
Atty.

No. 845,242. PATENTED FEB. 26, 1907.
L. LEIDL.
MAST FOR WIRELESS TELEGRAPHY AND OTHER PURPOSES.
APPLICATION FILED AUG. 1, 1906.

2 SHEETS—SHEET 2.

Witnesses.

Jesse N. Lutton.
O. N. Sommers

Inventor.

Ludwig Leidl.
by Henry Orth
Atty

UNITED STATES PATENT OFFICE.

LUDWIG LEIDL, OF VIENNA, AUSTRIA-HUNGARY.

MAST FOR WIRELESS TELEGRAPHY AND OTHER PURPOSES.

No. 845,242. Specification of Letters Patent. Patented Feb. 26, 1907.

Application filed August 1, 1906. Serial No. 328,774.

*To all whom it may concern:*

Be it known that I, LUDWIG LEIDL, a subject of the Emperor of Austria, residing at Vienna, Empire of Austria, have invented certain new and useful Improvements in Masts for Wireless Telegraphy and other Purposes, of which the following is a specification.

Masts or posts are frequently required for various purposes, such as for wireless telegraphy, which can be rapidly erected and dismounted and which can be taken to pieces for facility of transport, but which at the same time are required to fulfil certain conditions in regard to the strength of the connections, stability, and the like.

The present invention relates to a construction of masts fulfilling these conditions, which consists of a structure formed of rigid parts and flexible wires or wire ropes and composed of a series of separate frames or elements combined with each other in such manner as to be easily detached, the several parts when detached being capable of being arranged in a packet taking up a comparatively small space without requiring the entire disconnection of the separate parts of the elements. The masts constructed of such separate frames are secured in the vertical position by a special staying and anchoring arrangement which enables the most advantageous transmission of lateral strains to the separate parts of the mast. In order that the wire ropes employed in this construction for the staying and connecting the rigid parts of the mast may be subject only to elastic stretching and no permanent stretching when being strained, they are advantageously made of wires that are not twisted together, but are laid parallel to each other and are secured together by sheaths or other means.

Figure 9:
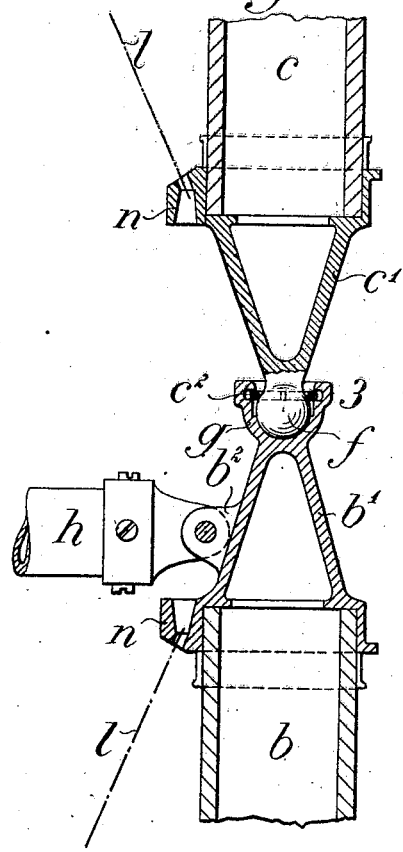
Figure 10:
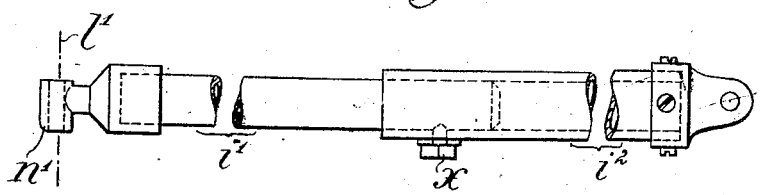

The accompanying diagrammatic drawings show in elevation at Figures 1 and 2 two different modes of construction of a mast built up according to the present invention. Fig. 3 is a plan of the arrangement shown in Fig. 1. Figs. 4, 5, 6, and 7 show diagrammatic views of various arrangements of the staying and anchoring devices of the masts. Fig. 8 shows a suitable construction of the wire ropes. Fig. 9 shows a section of a form of the connection of the separate parts of the mast elements with each other. Fig. 10 represents an elevation of a transverse strut capable of being lengthened and shortened.

In the construction shown at Fig. 1 the mast is composed of a central column 1 2 3 4, formed of separate detachable parts $a\ b\ c\ d$, which are preferably constructed of thin tubes and are fitted together in any suitable manner so as to be readily disconnected—for example, in the manner shown at Fig. 9, where the end of the one section of the column engages by means of a ball $f$ with the socket $g$ of the next adjacent section of the column. In this instance the parts of the mast are preferably made of steel tubes provided at their ends with shoes $b'\ c'$, Fig. 9. The latter are provided with balls $f$ and sockets $g$. In the interior annular groove of the socket $g$ a split elastic ring $c^2$ can be inserted, which is so arranged that when the ball $f$ is placed in the socket $g$ the ring $c^2$ will overlap the ball $f$, so that the connection between $g$ and $f$ is sufficiently secured. At each second joint—i. e., at 2 4—the central column is stiffened by means of transverse struts $h\ k\ i\ h'\ k'\ i'$, arranged in three or more radial planes and connected at their inner ends to the central column in a readily-detachable manner and stayed by means of wire or wire ropes $l$. These wire ropes are stretched in a slanting direction between the outer ends of the transverse struts of the column-sections situated above and below the same. The entire mast is therefore composed of double-pyramid-shaped frames, which are connected together by longitudinal wires or wire ropes $l'$, situated between the outer ends of the transverse struts.

In the form of structure shown in Fig. 9 one of the shoes $b'$ is provided with ears $b^2$, that can be connected with an eye arranged at the ends of the transverse struts $h\ i$ by means of removable bolts. The flanges of the shoes $b'\ c'$, that support the ends of the column parts $b\ c$, as well as the ends of the transverse struts, are provided with eyes $n\ n'$, through which the wire ropes $l\ l'$ are passed.

The stiffening of these separate frames— $i\ e.$, the obtaining of the necessary tension in the wires or wire ropes when mounting the structure—is effected by arranging longitudinally one transverse strut in each frame, or in frames with more than three struts one or more of these, so as to be capable of being lengthened or shortened. For example, such strut can, as shown in Fig. 10, be constructed of two parts $i'$ and $i^2$, telescopically sliding in each other, which are secured firmly together in their fully-extended position by a suitably-removable screw $x$ or clamp or the like.

By the removal of the connecting-wires $l'$ the entire mast can be separated into separate frames, which latter can be folded together to form a packet occupying but little space without necessitating a complete detachment of the separate parts of each frame. This folding together of a separate frame is effected in such manner that it is first loosened by the shortening of the extensible strut—for example, $i$ in Fig. 3—after which the two column-sections $a\ b$ are separated from each other at 2, whereupon the one column-section is slid against the other one until both parts are arranged parallel side by side, and lastly the struts are also laid side by side.

The column parts and the transverse struts can at the joints 2 4 be fitted together without requiring any special exertion, the wire ropes not being tensioned yet, (position of rest of separate frames or mast elements,) whereupon by lengthening the said extensible transverse strut to a predetermined extent the necessary tension for mounting will be effected in all parts of the separate frames, (tensional position.)

For fitting together an entire mast the number of separate frames necessary for this purpose are arranged in a row on the ground, whereupon the connecting-wires $l'$ are attached. All the separate frames are first brought into the position of rest and then into the tensional position, so that the mast can now be erected.

The connection of the separate frames with each other can be so effected, as shown at Fig. 2, that also at the joints between the separate frames auxiliary transverse struts $h^\times k^\times i^\times$ are arranged, and the ends of the latter are connected by wires or wire ropes with the joints 2 4 of the separate frames, so that the connecting-wires $l'$ are dispensed with.

The staying and anchoring of the mast constructed as described is effected in at least three different directions in the following manner: At a suitable distance from the end of the mast resting on the ground a length of wire rope or a loop thereof $o$, Fig. 4, is connected with both ends to one of the mast's joints. In the loop is fitted loose a pulley $p$, the fork of which is connected to the anchoring-rope $q$. When this rope $q$ after being anchored in the ground is stretched the roller in the loop will of itself assume that position in which an equalization of the strains in the separate parts of the rope will be effected and lateral strains exerted on the mast by wind-pressure or other causes will be transmitted to the mast in the most favorable manner. This arrangement can, as shown at Fig. 5, be employed in multiple form by providing two or more such loops $o\ o'$ with rollers $p\ p'$, the forks of the latter being again connected by loops of wire ropes, while the last outer loop $o^\times$ is connected with the anchoring-rope $q$. When using a number of ropes $s$ connected at distances apart to the mast and united at a point $r$, Fig. 6, an auxiliary mast $t$ is advantageously employed, which abuts on the ground at the foot or bearing of the mast and whose other end is connected to the point of the union $r$ of the ropes, whereby also the above-stated advantage of the equalization of the strains is effected. Both arrangements of ropes can, however, be combined with each other, as shown at Fig. 7, by uniting together several groups of ropes (without auxiliary mast) at the connecting-points by means of loops, the fork of the outermost loop being connected to the anchoring-rope $q$. In the arrangement shown there are only two groups of ropes $s'$ and $s^2$ with a single connecting-loop $o^\times$.

With a mast composed of rigid and flexible elements, as described, with a staying and anchoring arrangement also composed of flexible members, it is of importance that these flexible parts in being subject to a tensional strain are only subject to an elastic stretching and not a permanent one, because otherwise a continual adjustment, occupying much time, would be required and the mast would lose its strength and stability when subject to strong lateral pressures. It is therefore of advantage to employ ropes which, as shown at Fig. 8, are composed of wires $u$ laid parallel side by side and not twisted together and which are held together by a woven covering or otherwise.

I claim—

1. A separable mast for wireless telegraphy and the like comprising a plurality of detachable sections, transverse stiffening members for each section and flexible means to connect the ends of said members to their respective sections.

2. A separable mast comprising detachable sections, a plurality of transverse struts connected to and between the ends of the sections and flexible means connecting the ends of the struts with each other and to the ends of the respective sections.

3. A separable mast comprising detachable sections, a plurality of transverse struts connected at one end to substantially the middle of each section and symmetrically arranged, wire ropes connecting the ends of the struts with the ends of the sections.

4. A separable mast comprising a plurality of detachable sections, transverse struts connected at one end to a section between its ends, ropes connecting the ends of the struts with the ends of their respective sections and with each other, and guy-ropes having equalizing means between their upper ends and the mast to hold the latter elevated.

5. A separable mast comprising a plurality of sections, struts secured at one end between the ends of each section, flexible means to connect the ends of the struts with the ends of their respective sections and auxiliary struts at the joints of the mast, flexible means connecting the outer ends of said auxiliary struts to the sections on both sides of the joint.

6. A separable mast comprising a plurality of sections, three struts secured at one end to each mast-section, ropes connecting the ends of the struts with each other and with the end of the section and a like number of auxiliary struts secured at the joints between the sections, ropes connecting the ends of the auxiliary struts with each other and to the points where the main struts are secured to the sections on each side of the joint.

7. A separable mast comprising a plurality of mast-sections each section consisting of two parts connected together, struts connected at their inner ends to each section near the joint thereof, and flexible means connecting the ends of the struts together and to the ends of the section.

8. A separable mast comprising a plurality of sections each section composed of two detachably-connected parts, struts connected symmetrically at their inner ends to the section near the joint, wire ropes connecting the outer ends of the struts to each other and to the ends of the section and auxiliary struts whose inner ends are connected to the mast at the joint between the sections, wire ropes connecting the outer ends of the struts with each other and with the middle of the adjacent sections.

9. A separable mast comprising a plurality of sections, struts for each section symmetrically arranged and connected at their inner ends to the section, one or more of said struts extensible, ropes connecting the outer ends of the struts with each other and with the ends of the sections.

In testimony whereof I have hereunto set my hand in presence of two subscribing witnesses.

LUDWIG LEIDL.

Witnesses:
    JOSEF RUBARCH,
    ALVESTO S. HOGUE.